United States Patent [19]

Miyamoto

[11] Patent Number: 4,620,781
[45] Date of Patent: Nov. 4, 1986

[54] IMAGE PROCESSING APPARATUS FOR DETECTING SIZE OF THE ORIGINAL

[75] Inventor: Koichi Miyamoto, Tama, Japan

[73] Assignee: Canon Kabushiki Kaisha, Tokyo, Japan

[21] Appl. No.: 537,679

[22] Filed: Sep. 30, 1983

[30] Foreign Application Priority Data

Oct. 12, 1982 [JP] Japan .................. 57-179428

[51] Int. Cl.[4] ............................................ G03G 15/00
[52] U.S. Cl. ........................................ 355/3 R; 355/8; 355/75; 358/285
[58] Field of Search ............... 355/3 R, 8, 11, 14 R, 355/14 SH, 68, 75, 41; 358/285, 293, 244; 250/571, 223 R; 356/446, 447

[56] References Cited

U.S. PATENT DOCUMENTS

| | | | |
|---|---|---|---|
| 3,752,558 | 8/1973 | Lloyd | 350/6 |
| 3,834,807 | 9/1974 | Fuller et al. | 355/3 R |
| 3,912,387 | 10/1975 | Brooke | 355/3 R |
| 3,914,049 | 10/1975 | Basu et al. | 355/68 |
| 4,325,086 | 4/1982 | Sato et al. | 358/285 X |
| 4,338,020 | 7/1982 | Yukawa et al. | 355/41 |
| 4,411,516 | 10/1983 | Adachi et al. | 355/3 R X |
| 4,439,790 | 3/1984 | Yoshida | 358/256 |
| 4,455,577 | 6/1984 | Tokahara | 358/293 Y |
| 4,484,070 | 11/1984 | Inoue | 271/258 X |

FOREIGN PATENT DOCUMENTS

| | | | |
|---|---|---|---|
| 54-626 | 5/1979 | Japan | 355/14 SH |
| 1352680 | 5/1974 | United Kingdom | |
| 1579758 | 11/1980 | United Kingdom | |

*Primary Examiner*—Arthur T. Grimley
*Assistant Examiner*—J. Pendegrass
*Attorney, Agent, or Firm*—Fitzpatrick, Cella, Harper & Scinto

[57] ABSTRACT

An image processing apparatus comprising a light source for illuminating an original, a photosensor receiving a reflected light from the original when it is illuminated by the light source, and a cover for covering the back face of the original and having a specular reflection surface opposed to the light source, the photosensor being so disposed that it receives a light scatteredly reflected by the original but not a light specularly reflected by the specular reflection surface of the covering.

19 Claims, 19 Drawing Figures

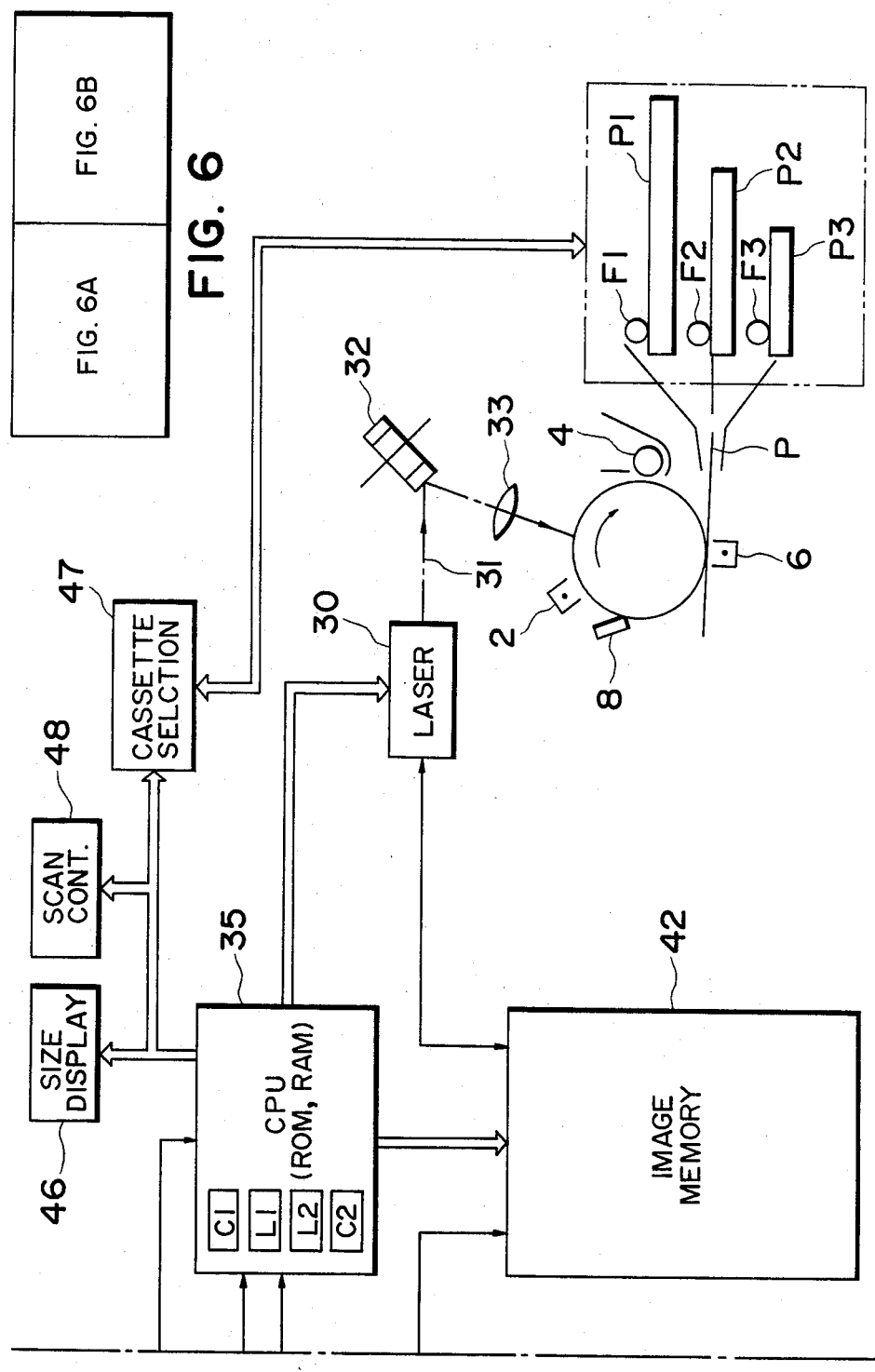

IMAGE PROCESSING APPARATUS FOR DETECTING SIZE OF THE ORIGINAL

BACKGROUND OF THE INVENTION

1. Field of the Invention

The present invention relates to an apparatus for processing an image of an original, such as copying machines, facsimiles, image memory systems and the like.

2. Description of the Prior Art

In image processing systems, various detections, for example, detection of the size of an original, or detection of the position of an original are carried out. In an image processing system of a type in which an original is carried across the optical path of an image projection optical system by the use of an original conveying device such as a belt or roller while scanning the original, or in which the original is carried to and positioned in a predetermined area on an original supporting surface by the above original conveying device before the image of the original is projected, it is required to detect whether or not the original is in a predetermined position in said optical path, whether or not the original is present on the original supporting surface at a predetermined position or whether or not the original has reached these predetermined positions.

In a further image processing system of a type in which the size of recording paper is selected in response to the detection of the size of original, and in which the projection magnification of an image is automatically changed in response to the combination of the size of original and the size of recording paper or an original is read by an image pick-up element with the resulting data being converted into electrical signals which are used to write the image on a photosensitive surface, a recording paper or the like, the image signals are written only in the region corresponding to the size of original.

The simplest and most practical method for recognizing the position, presence or size of an original is an optical system wherein a region at which an original is set is illuminated, and the resulting reflected light is received by a photosensor, whereafter the output of the photosensor indicative of the intensity of the received light is used to discriminate the position, presence or size of the original.

The region in which an original is placed when the position, presence or size thereof is detected, is usually coincident with a region on which the original is placed for projecting the image thereof onto an electrophotographic type photosensitive member or an image pick-up element. It is usual to locate a covering member in such a region on the side of the backface of the original for placing the original in close contact with the original supporting surface and/or for preventing the original illuminating light from leaking to the outside. The surface of the covering member facing the back side of the original may be recorded as an image if the size of the original is smaller, so that that surface of the covering is generally of a white-colored light diffusion face. On the other hand, the background of the original is often white. It is therefore difficult to discriminate the reflective light from the original from the reflective light of the covering surface on the basis of the output signals of the photosensor.

It has been proposed that the covering surface be colored black or that the covering member be opened if it is desired to detect the position, presence or size of the original. By doing so, identification of the original can easily be made since the photosensor does not receive any light from the region outside of the original. In such a case, however, there is the following problem. Generally, when the image of an original is projected onto a photosensitive member or is read by an image pick-up element, the original is irradiated by illumination means with the resulting reflective light being imaged on the photosensitive member, solid-state image pick-up element or the like through an optical system. At this time, a portion of the light illuminating the original is scatteredly reflected by the surface of the original, while the rest of the light transmitted by the original and exits from the backface of the same. The ratio of these light portions depends on the characteristics of the original such as material, thickness and others. If other paper or a white-colored covering member is behind the original, the light transmitted through the original is reflected by the surface of the other paper or white-colored covering, and again passes through the original and then projected on the photosensitive member or image pick-up element through the above optical system. That is, it is added to the previously projected or read light. In the ordinary image processing systems, accordingly, the level of the white background is determined by the light amount added by the light that has returned through the original. Therefore, if the covering member is black-colored or opened, the light transmitted by the original will be absorbed by the black-colored face of the covering member or scattered into the atmosphere so that such light cannot be used to expose the photosensitive member or to read the image. It follows that the black-colored or opened covering results in reduced level of light amount of the background of the original in comparison with the white-colored covering. For example, in the case of an original made of high-quality paper such as is used in ordinary office work, the reproduced image will have a very foggy background. In the case of an original made of tracing paper such as is generally used in drawing etc., the reproduced image will have dark background so that the information of the image cannot be discriminated from the background.

The currently practical method is that the covering member is colored with the color to which the photosensitive member or image pick-up element is highly sensitive, that is, which is deemed to be white by the photosensitive member or image pick-up element, while using a photosensor which is substantially insensitive to that color. In such a case, the photosensor is less sensitive to the color of the covering member so that it can be discriminated from the white-colored background of the original. However, the color of the original background is not necessarily white. There may be used also any colored background in an original. This method is not applicable to such a case. Further, this method cannot be utilized in a system that uses same element as a photosensor for detecting the position, presence or size of an original and also as an image pick-up element for reading the image of the original to produce electric signals representing the image.

SUMMARY OF THE INVENTION

It is an object of the present invention to provide an improved image processing apparatus.

Another object of the present invention is to provide an image processing apparatus which can detect the position, presence, size or others of an original without reducing the light amount level of the background of the original.

Still another object of the present invention is to provide an image processing apparatus which can detect the position, presence, size or others characteristics of an original having a colored background.

These and other objects, features and advantages of the present invention will become more apparent upon a consideration of the following description of the preferred embodiment of the present invention taken in conjunction with the accompanying drawings.

BRIEF DESCRIPTION OF THE DRAWINGS

FIG. 6 comprising FIGS. 6A and 6B is a view illustrating the signal processing system for the device shown in FIG. 5;

DESCRIPTION OF THE PREFERRED EMBODIMENTS

Figure 1:
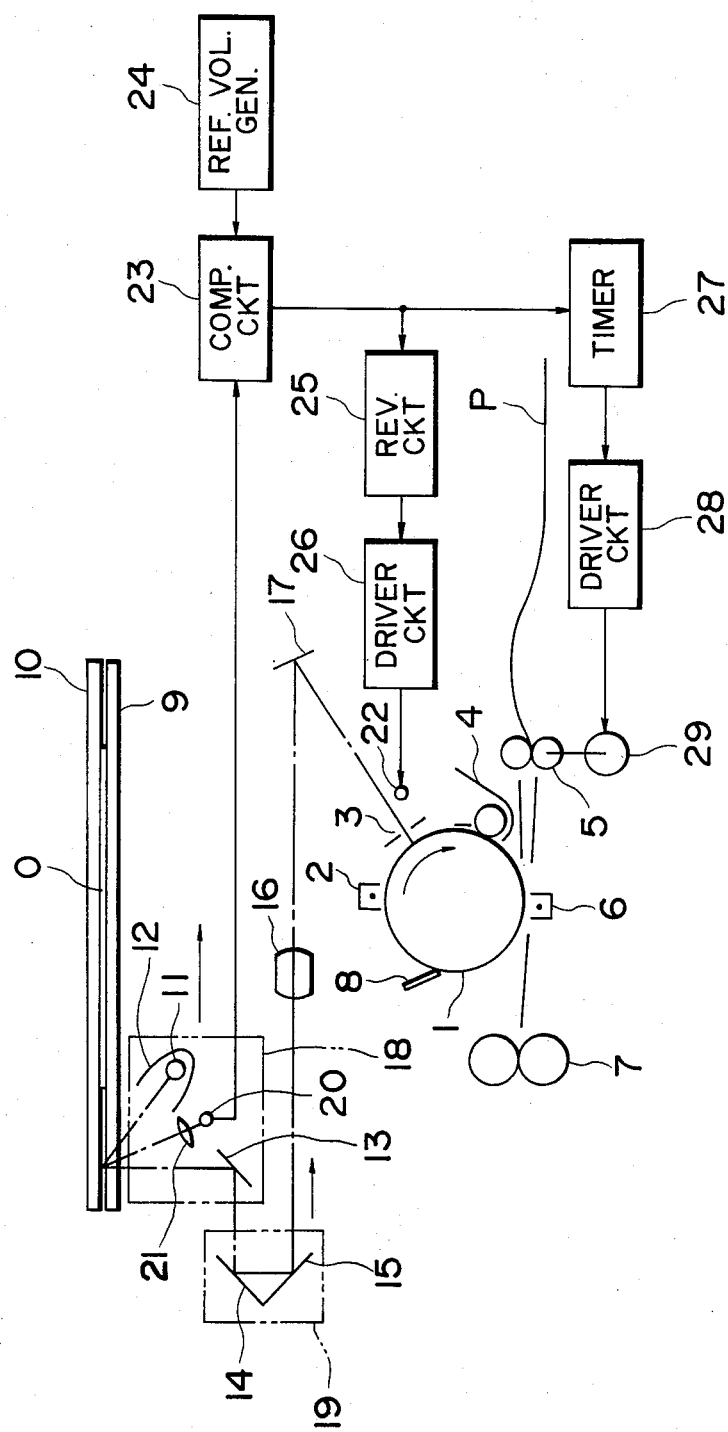
FIG. 1 is a view illustrating one embodiment of the present invention.

FIG. 1 shows an electrophotographic type copying machine to which the principle of the present invention is applied. In this figure, the copying machine is shown as containing a photosensitive drum 1 including an electrophotographic type photosensitive layer on the outer periphery thereof, which drum may be replaced by a photosensitive member of different configuration as in the form of a belt. The photosensitive drum 1 is rotated in the direction of the curved arrow and uniformly charged by a charger 2. At an exposure station, the drum 1 is slit-exposed to the image of an original through a projection optical system, which will be described hereinafter, via a slit 3. Such an exposure forms an electrostatic latent image which will in turn be developed to a toner image by a development device 4. At the transfer station, the formed toner image is transferred to a recording paper P under the action of a transfer charger 6. The recording paper P is conveyed to the transfer station by registration rollers 5 at the same speed as the drum 1 peripheral speed with such a timing that the leading edge of the recording paper P will be in a predetermined positional relationship with the leading edge of the toner image on the original O. For example, the leading edge of the paper P may be placed in coincidence with or ahead of that of the toner image. After the transfer step, the paper P is directed to a fixing device 7 wherein the transferred image is fixed to the paper P. On the other hand, the drum 1 is cleaned by a cleaning device 8.

The original O is placed face down on an original supporting carrier 9 which is a transparent and flat plate as made of glass to face the surface to be copied to the projection optical system. In order to prevent the light from a lamp 11, which will be described hereinafter, from externally leaking through the carrier at the region outside the original, the back face of the original which is opposite to the face to be copied is covered by a covering member or covering 10 which is of a size capable of covering the entire area of the carrier 9. The covering member 10 is hinged on the carrier 9 by any well known means. In its closed position, the covering member 10 holds the original O against the upper surface of the carrier 9 with the face to be copied in close contact with the latter.

Reference numeral 12 designates a reflector having a quadric surface such as an ellipsoid. The light emitted from the lamp 11 is condensed onto the upper face, that is, the original supporting face, of the carrier 9 by the reflector 12. The light scatteredly reflected by the original irradiated by the lamp 11 is subsequently reflected by mirrors 13, 14 and 15 toward an imaging lens 16. After being passed through the lens 16, the light is reflected by a mirror 17 and then projected onto the drum 1 through the slit 3 as an image. The lamp 11, reflector 12 and mirror 13 are fixedly secure to a first movable carriage 18 as a unit while the mirrors 14 and 15 are fixedly mounted on a second movable carriage 19 as a unit. When the original is scanned to project the image thereof on the drum 1 through the slit, the first and second carriages 18, 19 are moved forward, that is, right-ward as viewed in FIG. 1, parallel to the carrier 9 at a speed ratio of 1:½. The speed in the forward movement of the first carriage 18 is equal to the peripheral speed of the drum 1 times the inverse number of the magnification used in the particular copying operation. After termination of the scanning, the first and second carriages 18, 19 are moved rearwardly, that is, leftward as viewed in FIG. 1.

It is preferable that the lamp 11 and reflector 12 are so arranged and oriented that the center of brightness distribution on the original supporting surface irradiated by the light from the lamp 11 and reflector 12 will substantially be coincide with the principal ray in the image forming beam formed the projection optical system which is constituted of the aforementioned mirrors and lenses.

Reference numeral 20 denotes a photosensor of silicon photocell or the like which is adapted to generate a voltage output depending on the amount of light received by the photosensor. There is provided an imaging lens 21 adapted to receive the scattered light from the original irradiated by the lamp 11 to form the image of the original on the photosensor 20. The light emitted from the lamp 11 is not incident directly on the photosensor 20 since it is blocked by the reflector 12. If the photosensor 20 is located in such a position that the blocking of the reflector 12 is insufficient, another blocking member may be disposed between the lamp 11 and the photosensor 20. The lens 21 and photosensor 20 are fixedly mounted on the carriage 18 so that they move together with the components 11, 12 and 13 as a unit.

If the lens 21 and photosensor 20 are so arranged and oriented that a portion of the original which is currently being projected on the drum 1 through the aforementioned imaging optical system will simultaneously be imaged on the photosensor 20 as shown, for example, by causing the principal ray of the image forming beam from the lens 21 to substantially coincide with the principal ray of image forming beam to said projection optical system on the original supporting surface and so on, the image of the leading edge of the original will be projected on the drum 1 at the same time as the leading edge of the original is detected such that the signals from the photosensor 20 can be used to effect a control, which will be described hereinafter, in real time. Thus, various circuits such as signal delaying circuits and others can be omitted or reduced in number. This, however, it not limiting, that is, the lens 21 and photosensor 20 may be oriented to a region ahead of the region of the original or original supporting surface which is facing the projection optical system, that is, which is currently being projected on the drum 1, in the direction of forward movement by the carriages 18 and 19. Thus, the leading edge of the original is detected before the image thereof begins to be projected on the drum 1. In such a case, the control described hereinafter may be carried out with the signals from the photosensor 20 delayed by a time interval corresponding to the spacing between the above two regions with respect to the direction of scanning of the original as by the use of a delay circuit or the like. Alternatively, the lens 21 and photosensor 20 may be oriented to a region backward of the region of the original or original supporting surface to which the projection optical system is oriented in the direction of forward movement by the carriages 18 and 19 such that the leading edge of the original will be detected after the image thereof begins to be projected on the drum 1. In the last-mentioned case, the path of the recording paper from the rollers 5 to the transfer station is made smaller than the peripheral distance of drum movement from the exposure to transfer station, and by actuating the rollers 5 upon detecting the leading edge of the original by the photosensor 20, the leading edge of the recording paper P can be brought into said predetermined positional relationship with the leading edge of the toner image. In the illustrated embodiment, the path of the recording paper is equal to the peripheral distance of drum movement such that the rollers 5 is actuated substantially at the same time as the leading edge of the original is detected to cause the leading edge of the paper P to be coincident with the leading edge of the toner image. However, this is not limiting, that is, the path of the recording paper may be smaller than the angular distance of drum movement such that the actuation of the rollers 5 is initiated past a predetermined time period through a delay circuit after the leading edge of the original is detected.

In the system, described hereinbefore, in which the leading edge of the original is detected before the image thereof begins to be projected on the drum as described hereinbefore, the path of the recording paper may be designed to have such a distance that the leading edge of the paper P can be brought into the predetermined positional relationship with the leading edge of the toner image if the rollers 5 are actuated substantially at the same time as the above detection. Alternatively, the path of the recording paper may be smaller than the above distance. In the latter case, the actuation of the rollers 5 is initiated past a predetermined delay time through the delay circuit after the leading edge of the original is detected such that the leading edge of the recording paper P can be brought into a predetermined positional relationship with that of the toner image.

Numeral 22 denotes a lamp for irradiating the drum 1 to remove or erase the charge thereon after the drum has been charged by the charger 2. In other words, the lamp 22 is adapted to irradiate the drum 1 at its region in which no image of the original O is to be formed, so as to remove the charge thereon. Thus, the toner is prevented from being wasted by depositing the no-image region of the drum 1. The state (on-off) of the lamp 22 is controlled by detecting the leading and trailing edges of the original by the photosensor 20 such that the light irradiates a drum region forward of the region on which the leading edge of the original is projected and a drum region backward of the region on which the trailing edge of the original is projected. In the illustrated embodiment wherein the leading and trailing edges of the original are respectively detected at the same time as they are projected and imaged on the drum 1, the latter is exposed to the light from the lamp 22 through the slit 3 in the exposure station. The lamp 22 is maintained to be lighted on to irradiate the drum until the leading edge of the original is detected. Substantially at the same time as the leading edge of the original is detected, the lamp 22 is light off. Substantially at the same time as the trailing edge of the original is detected, the lamp 22 is re-lighted on. Alternatively, the drum 1 may be irradiated by the lamp 22 between the exposure station and the development station. In such a case, the lens 21 and photosensor 20 are so arranged that the detection of the leading or trailing edge of the original is delayed than the image thereof is projected on the drum. Alternatively, the actuation and deactuation of the lamp 22 are effected past a predetermined time period through a delay circuit after the leading and trailing edges of the original is detected as in the illustrated embodiment, so that the charge in the regions of drum surface forward of a position in which the leading edge of the original is imaged and backward of a position in which the trailing edge of the same is imaged can be removed. Further, in the system wherein the leading and trailing edges of the original are respectively detected before they are projected and imaged on the drum, the surface regions of the drum forward and backward of the region in which the leading and trailing edge of the original are imaged, respectively, can be discharged if the drum 1 is irradiated by the lamp 22 between the charger 2 and the exposure station.

Although the above embodiments have been described as actuating and deactuating the lamp 22 for removing the charge from the drum at the non-image-forming area thereof, the lamp 22 may be kept lighted on during the rotation of the drum 1 and a shutter may be provided between the lamp 22 and the drum so that said area will be discharged by controlling the shutter.

In any event, the leading edge of the original is detected to control the conveying of the recording paper P so that the leading edge of the original will be brought into a predetermined positional relationship with that of the recording paper P irrespective of the position of the original on the carrier 9. There are accordingly eliminated such disadvantages that the forward portion of the recording paper P has no image through its very large distance, that the rearward portion of the original is not recorded on the recording paper P, and so on. Thus, originals can more easily be placed on the carrier 9. Further, the developer cannot be wasted since the drum surface is effectively discharged forward and rearward than the leading and trailing edges, respectively, of the original irrespective of their positions on the carrier 9.

The covering 10 has its normal or specular reflection surface opposed to the carrier 9 and thus to the lamp 11. The normal or specular reflection surface is one having such a characteristic that an incident light is reflected by the surface with its reflection angle substantially equal to the incident angle. A so-called mirror surface has such a characteristic. The surface of a white-colored paper, a synthetic resin material added by a white colored fine particles or a white-painted plate is a scattering reflection surface but not the normal or specular reflection surface.

Figure 2:
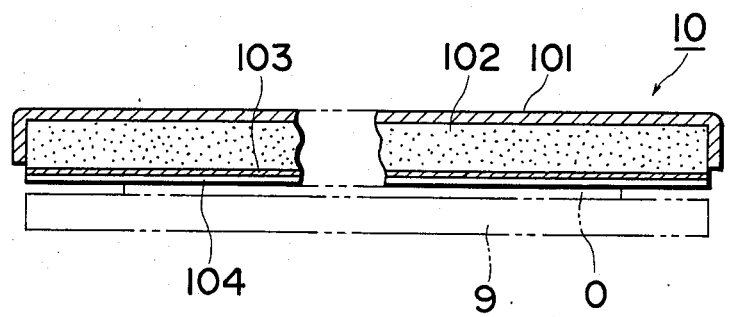
FIGS. 2, 3 and 4 illustrate the structure and function of a covering member constructed according to an embodiment of the present invention.

Referring now to FIG. 2, the covering member 10 comprises a hard base plate 101 of a hard plastic material or the like, a flexible and resilient plate 102 of a foamed rubber or the like for resiliently holding an original 0 against the carrier 9 in close contact with the latter, and a flexible, thin and transparent sheet 104 adhered to the resilient plate 102, the transparent sheet 104 being made of a polyester sheet or the like on which a film of aluminum, silver or the like is deposited by evaporation or the like or to which a foil of aluminum, silver or the like is adhered. The surface of the above metal film or foil defines a mirror surface (specular reflection surface) 103 which is flexibly deformed with the deformation of the resilient plate 102, and thus the sheet 104 follows the curvature of the original. The sheet 104 is placed in close contact with the back face of the original or with the original supporting carrier 9 at a region in which the original does not extend. In the illustrated embodiment, the mirror surface 103 is protected by interposing it between the sheet 104 and the resilient plate 102. However, the mirror surface 103 may be provided to directly contact the original and carrier 9. The sheet 104 also serves to maintain the above metal film or foil flat or smooth to keep the specular reflection property of the mirror surface 103.

If the apparatus is exclusively for thin sheets, the covering member 10 may be of a non-flexible and relatively thick metal plate of aluminum or the like with the surface thereof on the side opposite to the original supporting carrier 9 being polished to form a mirror surface. Further, the covering member 10 may be made of glass mirror or the like.

Figure 3:
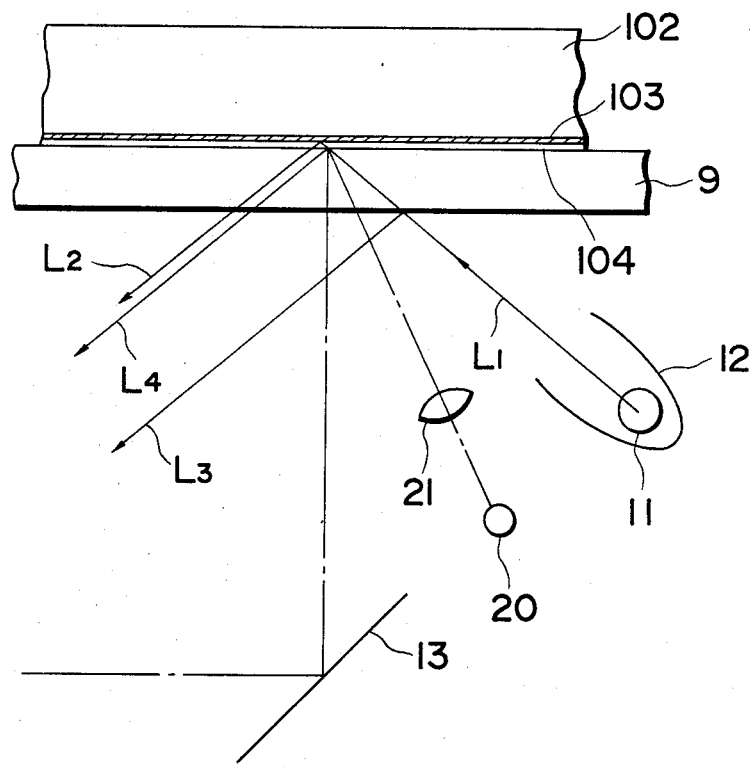

As shown in FIG. 3, the photosensor 20 is disposed in such a position that it does not receive that portion L2 of the light L1 from the light source means consisting of the lamp 11 and reflector 12 which is transmitted by the original carrier 9, is specularly reflected by the mirror surface 103 of the covering 10 and then again is transmitted by the original carrier 9 when no original is placed on the carrier 9. Thus, if light detection means consisting of the lens 21 and photosensor 20 is oriented to the region on which no original is placed, the light is not substantially incident on the photosensor 20. Therefore, the photosensor 20 senses this region as if it is black. In other words, the output voltage of the photosensor 20 is equal to zero or substantially equal to zero. The photosensor 20 also is so arranged and oriented that it does not receive light portions L3 and L4 respectively reflected by the upper and lower surfaces of the original supporting carrier 9, these light portions L3 and L4 being only of slight part of the light L1. The image projection optical system is so arranged and directed that the above light portions L2, L3 and L4 are not projected on the drum 1. This is accomplished, for example, by locating the mirror 13 in such a position that it does not receive the light portions L2, L3 and L4 or by positioning the optical system in such a position that even if the light portions are incident on the mirror 13, they are reflected without passing through the slit 3. This is because a flare may be produced to reduce the quality of an image if the above specularly reflected light is incident on the photosensitive member. In any event, the photosensitive member is not exposed to any light through the projection optical system when the no-image region of the original is being scanned by the mirror 13. As described hereinbefore, this no-image region of the photosensitive member will be irradiated by the lamp 22 to remove the useless charge thereon.

Figure 4:
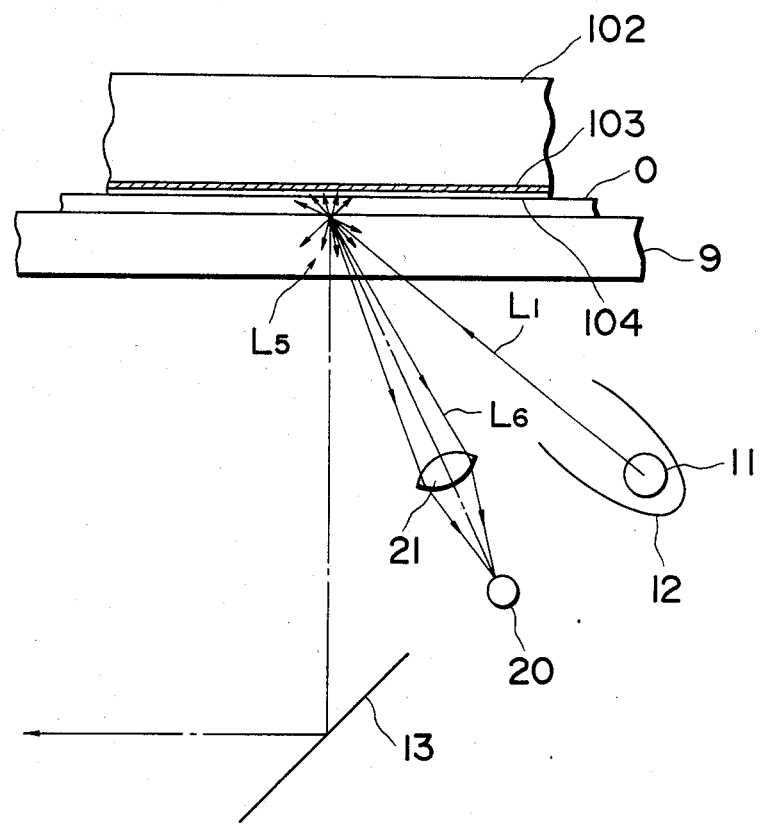

The portion where the original exists will now be described with reference to FIG. 4.

The light L1 emitted from the illumination lamp 11 mostly reaches the surface of the original O except the light portions (L3 and L4 in FIG. 3) which have been specularly reflected by the surface of the original supporting carrier 9.

On the surface of the original, part of the light is scatteredly reflected to form a light portion L6 which is directed along the imaging optical path of the lens 21. The light portion L6 is imaged on the photosensor 20 through the lens 21. Another beam of light incident on and transmitted into the original O is scattered therewithin and transmitted through the original O to the back face thereof. Since the back face of the original is covered by the mirror surface 103 of the original holding covering member, the scattered light is reflected back through the original O, within which it is further scattered, and then emitted from the front face of the original O with a portion of this light being imaged on the photosensor 20 through the lens 21. Even if there is black-printed area on the original O, the light portion surface-reflected (scatteredly reflected) at least reaches the photosensor 20, so that it is detected in a level different from that of the complete black color. Thus, the presence or absence of the original can be detected by the photosensor.

In connection with the exposure of the photosensitive member 1 to the image of the original, the light transmitted by the original is reflected by the mirror surface 103 of the covering so that there will not be problems such as reduction of white level and others as in such a system that the covering is opened to expose the photosensitive member to the image light. Although the covering according to the present invention has a mirror surface (specular reflection surface) different from the white-colored surface (scattered reflection surface) in the conventional covering, it is believed that there is substantially no difference between the scattered reflection surface and the specular reflection surface since the light which has passed through the original has already been scattered within the original. This has been proved in experiments. In the experiments, the photosensitive member 1 could be exposed to the image light completely with the same quality as in the conventional covering having its white-colored surface when the recording paper used is not only of high-quality papers but also of tracing papers. It is a matter of course that the light portion L5 scatteredly reflected by the surface of the original and the light portion transmitted by and scattered within the original, reflected by the mirror surface 103, returned through and scattered within the original and then again emitted from the original are also imaged on the drum 1 through the image projection optical system which consists of the components 13, 14, 15, 16 and 17.

Control in accordance with the output signals of the photosensor 20 will now be described with reference to FIG. 1. As described hereinbefore, the photosensor 20 generates at its output a lower voltage V1 (including 0

V) when any region other than the original is being scanned and a voltage Vh higher than the voltage Vl when the original is being scanned. In other words, the output of the photosensor 20 is changed from Vl to Vh as the leading edge of the original begins to be scanned. Upon termination of the scanning for the trailing edge of the original, the output of the photosensor 20 is changed from Vh to Vl. The output of the photosensor 20 is applied to a comparator circuit 23 wherein it is compared with a reference voltage Vs generated from a reference voltage generating circuit 24. The circuit 24 is set to provide Vl<Vs<Vh. The comparator 23 generates a signal at level 1 if the output signal of the photosensor 20 is higher than the reference voltage. If the output of the photosensor 20 is lower than the reference voltage, the comparator 23 generates a signal at level 0. In connection with this, the lamp 11 is lighted on only when the carriages 18 and 19 are forwardly moved, and lighted off when the carriages 18 and 19 are rearwardly moved. On the rearward movement of the carriages, therefore, the output of the photosensor 20 is zero volt, so that the output of the circuit 23 also becomes zero level.

The output signal of the comparator circuit 23 is applied to an reversing circuit 25 which generates at its output a signal at level 0 when the signal from the circuit 23 is a 1 level and a signal at leve 1 when the level of the signal from the circuit 23 is 0. The output of the circuit 25 is applied to a driver circuit 26 for the lamp 22, which circuit 26 causes the lamp 22 to light on when the signal from the reversing circuit 25 is at level 1. When the output signal of the reversing circuit 25 is at level 0, the driving circuit 26 causes the lamp 22 to light off. Thus, the lamp 22 will irradiate a region ahead of the leading edge of the imaged original O and a region backward of the trailing edge of the same to remove any charge therefrom.

On the other hand, the signal from the comparator 23 also is applied to a timer circuit 27 as in the form of a mono-stable multivibrator which generates a signal at level 1 during a predetermined time period starting at the time at which the signal of the comparator 23 is changed from level 0 to level 1. The above predetermined time period is the one required to move the recording paper P from this movement of the paper beginning upon actuation of the roller 5 to the trailing edge of the paper passing through the rollers 5. The signal from the timer circuit 27 is applied to a clutch driving circuit 28 which is adapted to energize a clutch 29 during the signal of level 1 from the timer circuit 27. The energized clutch 29 transmits a power from a source of driving power (not shown) to the registration rollers 5 to convey the paper P to the transfer station such that the leading edge of the recording paper P will be placed in a predetermined positional relationship with the leading edge of the toner image.

Although the embodiment has been described as having the photosensor 20 which does not receive the light specularly reflected by the mirror surface 103, the photosensor may be arranged to receive part of the specularly reflected light. In such a case, the photosensor 20 is so directed that the amount of specularly reflected light is sufficiently less than the amount of scatteredly reflected light such that it can be judged whether the photosensor 20 receives the light specularly reflected by the mirror 103 or the light scatteredly reflected by the original. In this case, the reference voltage Vs is set to be higher than the output voltage of the photosensor 20 which receives the light specularly reflected by the mirror surface 103 and to be lower than the voltage Vh.

Although the present invention has been described as to the system in which the scatteredly reflected light from the original is projected on the electrophotographic type photosensitive member through the projection optical system including the mirrors and lens to form a copy, the present invention may be applied to such a system that an original is read by a self-scanning type image pick-up element such as CCD or the like with the resulting signal being utilized to form a desired image. Such a system will now be described.

Figure 5:
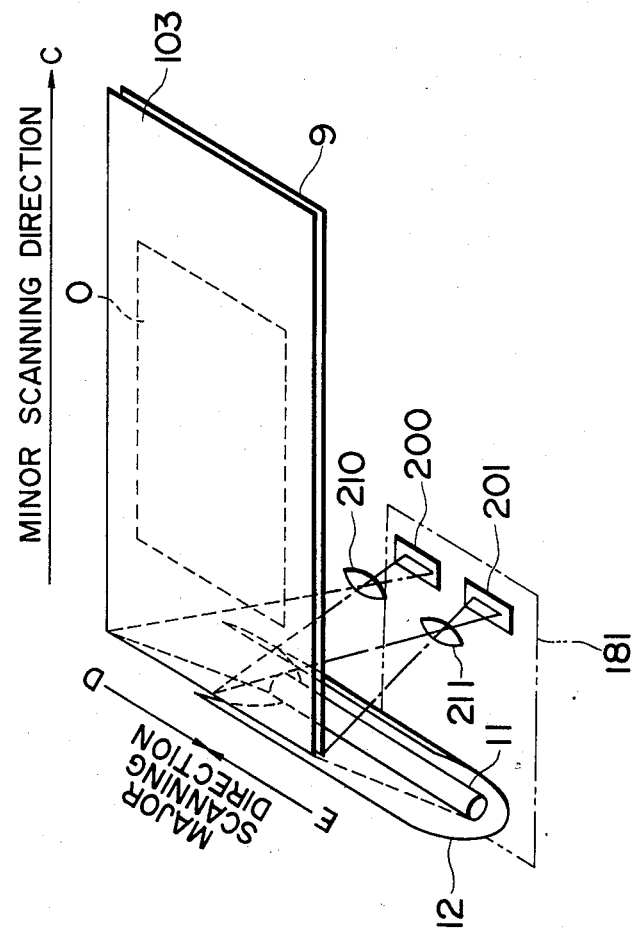
FIG. 5 is a perspective view illustrating the second embodiment of the present invention.

FIG. 5 shows an original reading device. An original to be read is interposed between the original supporting carrier 9 and the mirror surface 103 of a covering member 10 similar to that of the previous embodiment with the surface to be read faced downwardly.

The original O is similarly irradiated by light source means consisting of a lamp 11 and reflector 12 through the carrier 9. Light scatteredly reflected by the original O and light transmitted through and scattered within the original O, reflected by the mirror surface 103, transmitted again through and scattered within the original O and finally emitted from the original O are imaged through lenses 210 and 211 on line-scanning type solid-state image pick-up elements 200 and 201 of CCD or the like each of which is adapted to an electric output corresponding to the amount of light which is received by that image pick-up element. More particularly, a portion of the original O positioned on one side with respect to the primary scanning direction is imaged on the element 200 through the lens 211 while the other portion of the same located on the opposite side is imaged on the element 201 through the lens 211. The self-scanning direction (major or primary scanning direction) of the element 200 is shown by an arrow D while the self-scanning direction (major scanning direction) of the element 201 is shown by an arrow E opposite to the arrow D in direction. The elements 200 and 201 are used both to read the image of the original and also to detect the position and size of the original.

As in the photosensor 20, each of the pick-up elements 200 and 201 is so arranged that it receives a scatteredly reflected light by the original through the lens 210 or 211, but not a specularly reflected light by the mirror surface 103 at the no-original region. With respect to the no-original region, the output of each of the elements 200 and 201 is equal to zero or so low that it will discriminate this region to be of black color. As described hereinbefore, however, each of the elements 200 and 201 may be located in such a position that it receives a part of the specularly reflected light through the lens 210 or 211, if the amount of the specularly reflected light is less than the amount of the scatteredly reflected light from the original sufficiently to judge the presence or absence of the original.

The above components 11, 12, 200, 201, 210 and 211 are fixedly mounted on a movable carriage 181 as a unit which is in turn moved in the direction of arrow C from one end to the other end of the original supporting carrier 9 to effect the minor or secondary scanning operation for the original.

Figure 6A:
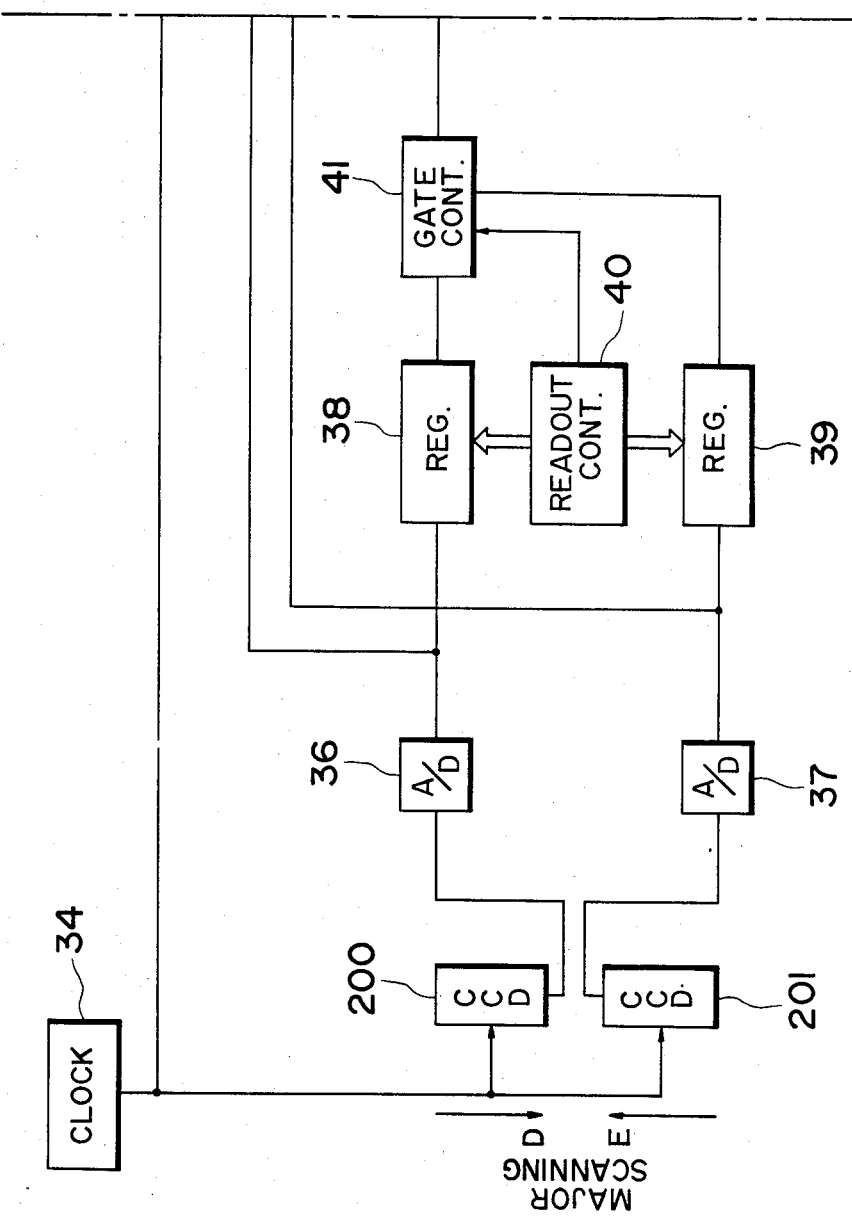

On the other hand, as shown in FIG. 6, a source of laser beam 30 in an image reproducing section is controlled by an image signal formed by reading the original O to form a laser beam 31 modulated in accordance with this signal. The laser beam 31 is deflected by scanning means 32 such as a polygonal mirror, a galvanomirror or the like and then imaged through a lens 33 on an electrophotographic type photosensitive drum 1 which is rotated in the direction of arrow. An electrostatic latent image so formed is developed by a development device 4 with the resulting toner image being transferred to a recording paper which has a size corresponding to that of the detected original and which is conveyed from proper one of plural cassettes P1, P2 and P3 containing recording papers of different sizes from one another, respectively. Numerals 2, 6 and 8 denote parts similar to those described in connection with FIG. 1. The image reproducing section including the source of laser beam 30, the drum 1 and others may be disposed separately of the original reading device section such that image signals from the latter can be transmitted to the image reproducing section through communication lines.

The prior art image processing system is disadvantageous in that a useless part out of the original is printed or part of the image is cut in print if the size of the original is smaller than the desired size or if the original is not properly positioned on the original supporting carrier. If an operator wrongly selects the size of recording paper, a proper printing operation cannot be carried out and yet recording papers is wastefully used.

In order to overcome such a problem, it is required that the position of the original O, that is, the original region and the non-original region being detected with the resulting detection being utilized to control a printer. In accordance with the present invention, the mirror surface 103 having its specular reflection characteristic is provided on the side of the covering member faced to the original such that at the non-original region, the pick-up elements 200 and 201 do not substantially receive the light to judge the non-original region to be in black level, and do sufficiently receive the light at the original region.

Figure 7:
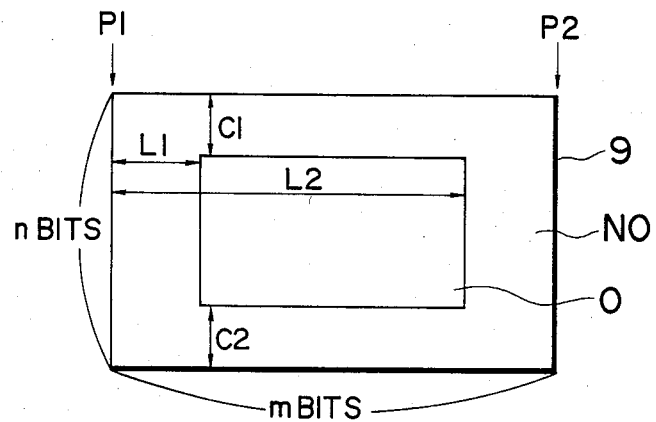
FIG. 7 is a view illustrating a procedure used in detecting the size of an original.

FIG. 7 illustrates a method for detecting the position of the original in the system shown in FIGS. 5 and 6. In FIG. 7, numeral 9 denotes the original supporting carrier, O an original region and NO a non-original region. The regions O and NO are covered by the mirror surface 103. Symbol P1 designates the start point of the mirror scanning operation while symbol P2 denotes the finish point of the minor scanning operation. It has already been understood that the number of all picture elements in the major scanning direction is equal to n bits while the number of all picture elements in the minor scanning direction is equal to m bits. The term "picture element" is intended to be a unit area on the surface to be read, which is read by a unit photoelectric converting element in the image pick-up element during a single reading operation. As shown in FIG. 5, when the minor scanning operation is initiated at the point P1, both the solid-state image pick-up elements 200 and 201 detect black level throughout the distance of the major scanning direction until they detect white level on the original. When the solid-state image pick-up element 200 initially detects white level, the number, L1-bits, of the picture elements (the number of scanning lines) in the minor scanning direction and the number, C1-bits, the picture elements in the primary scanning direction are stored in a memory. When the image pick-up element 201 initially detects white level, the number, C2-bits, of the picture elements in the major scanning direction is stored in the memory. Similarly, the number, L2-bits, of the picture elements until the scanning operation is terminated is stored in the memory. These are shown in FIG. 7.

Image information read by the scanning operation is stored in an image memory. If it is desired to read the image information out of the image memory, the latter can be addressed and read out in accordance with the bit numbers C1, C2, L1 and L2 to print out only the image information relating to the original from the image memory. L1 and L2 correspond respectively to the leading and trailing edges of the original while C1 and C2 correspond respectively to the leftward and rightward lateral edges of the original.

These bit numbers C1, C2, L1 and L2 can be utilized to know the size of the original. In other words, the size of the original is determined to be (L2−L1) bits for longer side and {n−(C1+C2)} for shorter side. This size is compared with bit values relating to several preselected kinds of sizes for recording papers with the result thereof being used to properly select the size of recording paper.

More particularly, in FIG. 6, numeral 34 denotes a clock pulse generator the output of which is supplied to the elements 200 and 201 and to a counter in a controlling section (CPU) 35 including a well known microcomputer. The system further includes A/D converters 36 and 37; registers 38 and 39 for temporally storing image information; a read-out controller 40 for reading out the contents of the registers 38 and 39, a gate controller 41 for converting data sharedly stored in the respective registers 38 and 39 into serial image information by a single scanning operation; an image memory 42 for storing image information with respect to the entire scanned area. The CPU includes ROM and RAM which can count and store the counts C1, C2, L1 and L2 for the position of the original and which has an addressing function for the image memory. Counters C1 and C2 are each capable of counting n/2 bits at minimum. Counters L1 and L2 each can count m bits at minimum. Image information scanned and read subsequently or simultaneously by the elements 200 and 201 is transferred to the A/D converters 36 and 37 by the clock of the clock pulse generator 34, wherein they are A/D converted and stored in the registers 38 and 39. At the same time, the counts C1, C2, L1 and L2 for the position of the original are counted by the CPU 35 in a manner as shown in FIG. 7. The contents of the register 39 are read out by the read-out controller 40 in the order opposite to that in input while the contents of the register 38 are read out by the read-out controller 40 in the same order as in input. The contents of the registers 38 and 39 are read out as serial image information by a single scanning operation by the switching of the gate controller 41 and subsequentially stored in the image memory 42.

Figure 8:
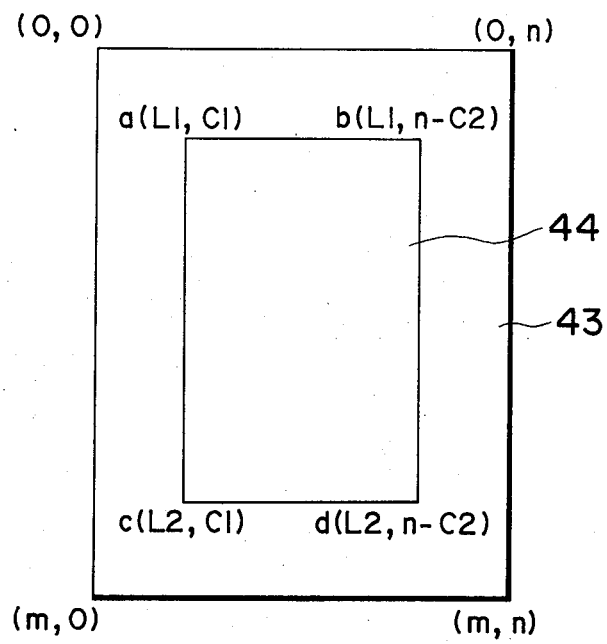
FIG. 8 illustrates the address map of an image memory.

FIG. 8 shows an address map in the image memory 42 shown in FIG. 6. If the address of the image memory 42 is allocated from (0, 0) to (m, n) as shown in FIG. 8, a co-ordinate relating to the position of the original which is inputted in the image memory 42 is represented by four points a, b, c and d in FIG. 8. Numeral 43 denotes an image memory while numeral 44 designates the image of the original stored in the image memory 43. Thus, the CPU 35 is addressed so as to output only the information of the original to the laser generator 30 which is a printer. If the beam 31 from the polygonal mirror 32 in the printer scans the longer side of the original, the image information in the image memory 42 is scanned as shown by (L1, C1)→(L2, C1). If the beam 31 scans the shorter side of the original, the image information is scanned as shown by (L1, C1)→(L1, n−C2). Thus, only the image information of the original in the image memory 42 is read out without reading out any unless data relating to the non-original region.

In accordance with the counts C1, C2, L1 and L2 for the position of the original stored in the CPU 35, the sizes of the original (L2−L1) and {n−(C1+C2)} are calculated to compare with several sizes of recording paper subsequently with the results being utilized to drive a cassette selection device 47 for selecting the size of recording paper properly corresponding to the size of the original. The cassette selection device 47 is adapted to energize a power transmitting clutch for one of feed rollers F1, F2 and F3 which is used to feed recording papers one at a time from the corresponding one of the cassettes P1, P2 and P3 are which is properly selected to drive a recording paper having a size corresponding to the size of the original being copied. Thus, a recording paper having an optimum size to record all the image information of the original will be carried to the transfer station.

The size of recording paper so selected is indicated by a size indicator 46 such as a known liquid crystal indicator or the like.

Also by comparing and calculating the determined size of the original with the sizes of transfer paper set in the copying machine, a copy magnification may be determined to drive a scanning and controlling device 48 to effect a copying operation with the magnification matching the transfer paper. This can be effected by changing a magnification of the image of the original projected on the image pick-up elements 200 and 201 through the lenses 210 and 211 and/or by changing the speed of the image pick-up elements in the minor scanning direction (the speed of the movement of the carriage 181).

Figure 9:
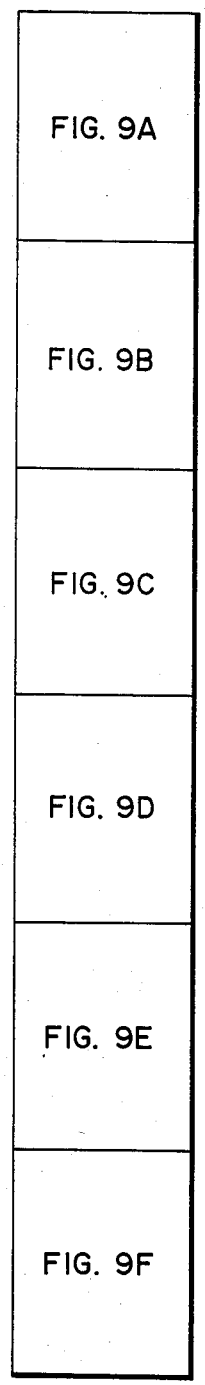
FIGS. 9, which comprises
Figure 9A:
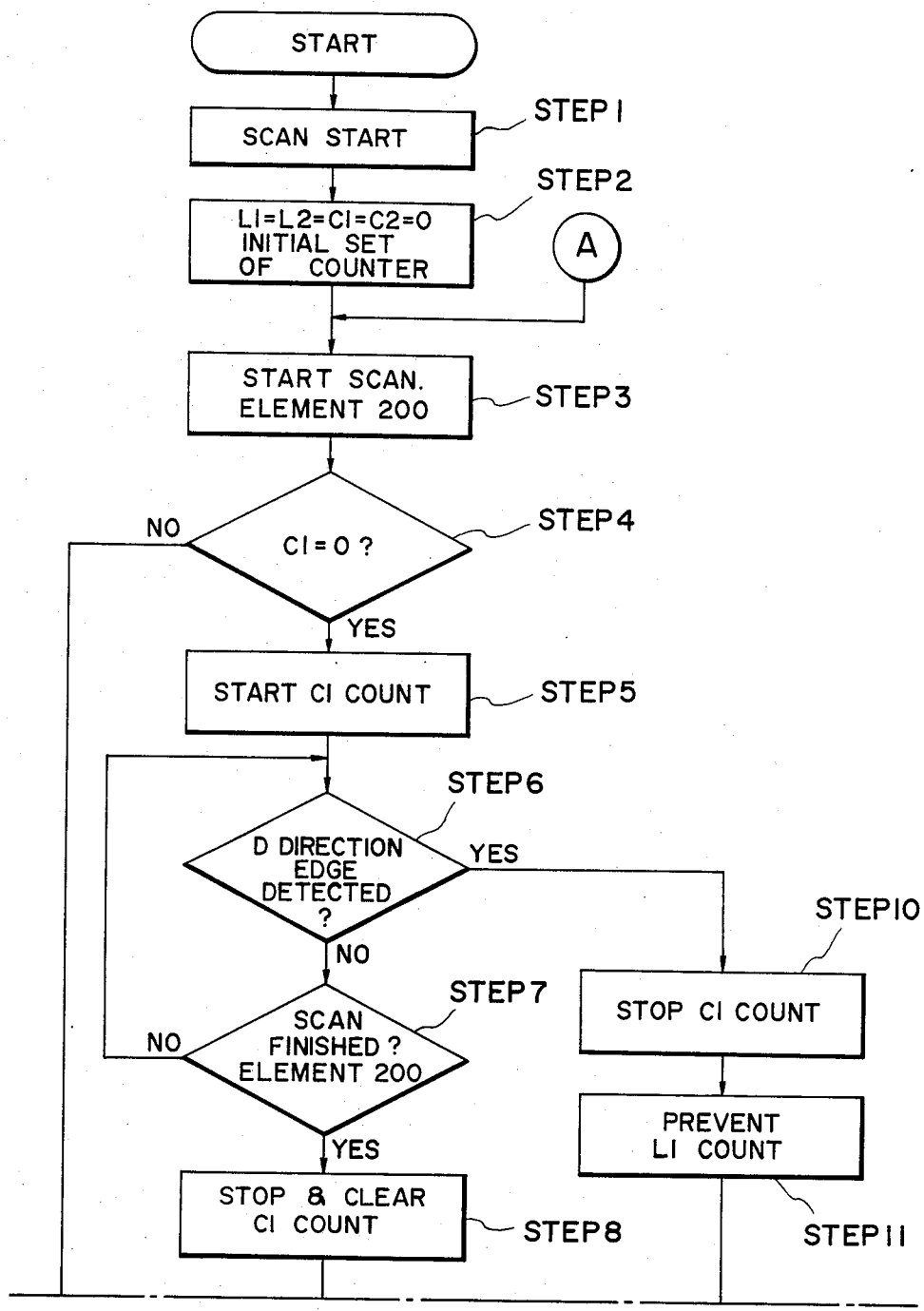
FIGS. 9A, 9B, 9C, 9D, 9E and 9F, and 10 are flow charts showing the control operation of the control section shown in FIG. 6.
Figure 9B:
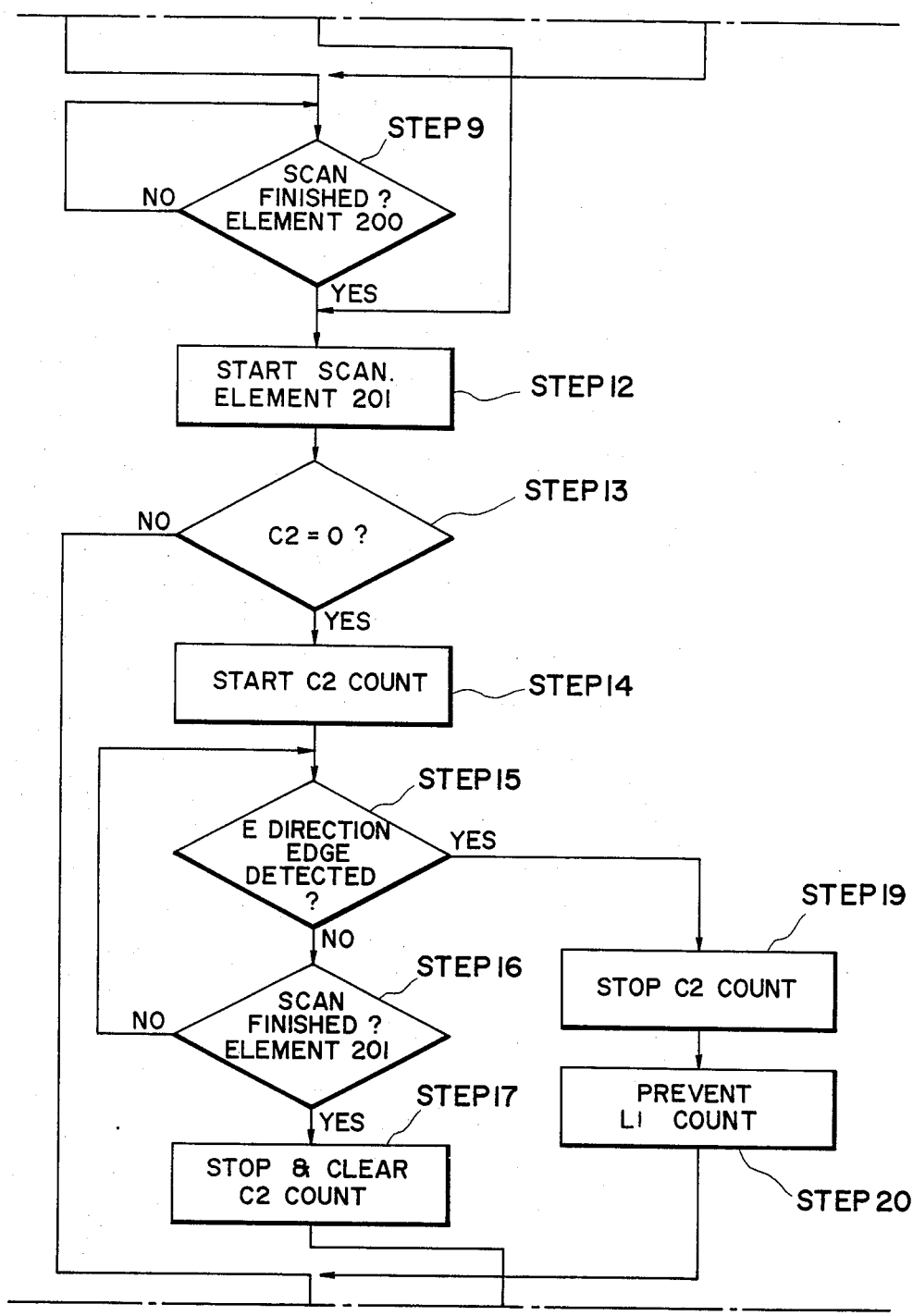
Figure 9C:
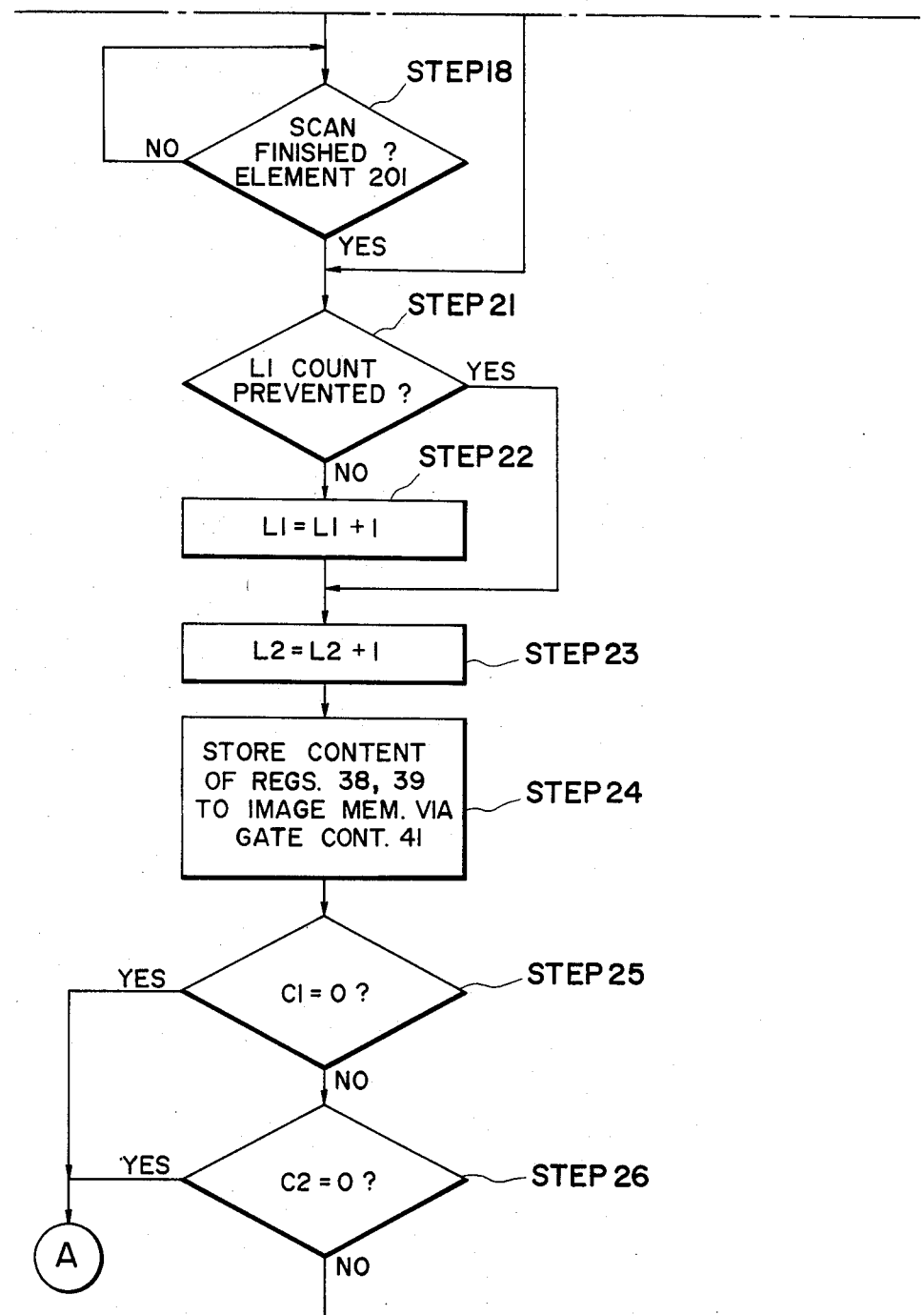
Figure 9D:
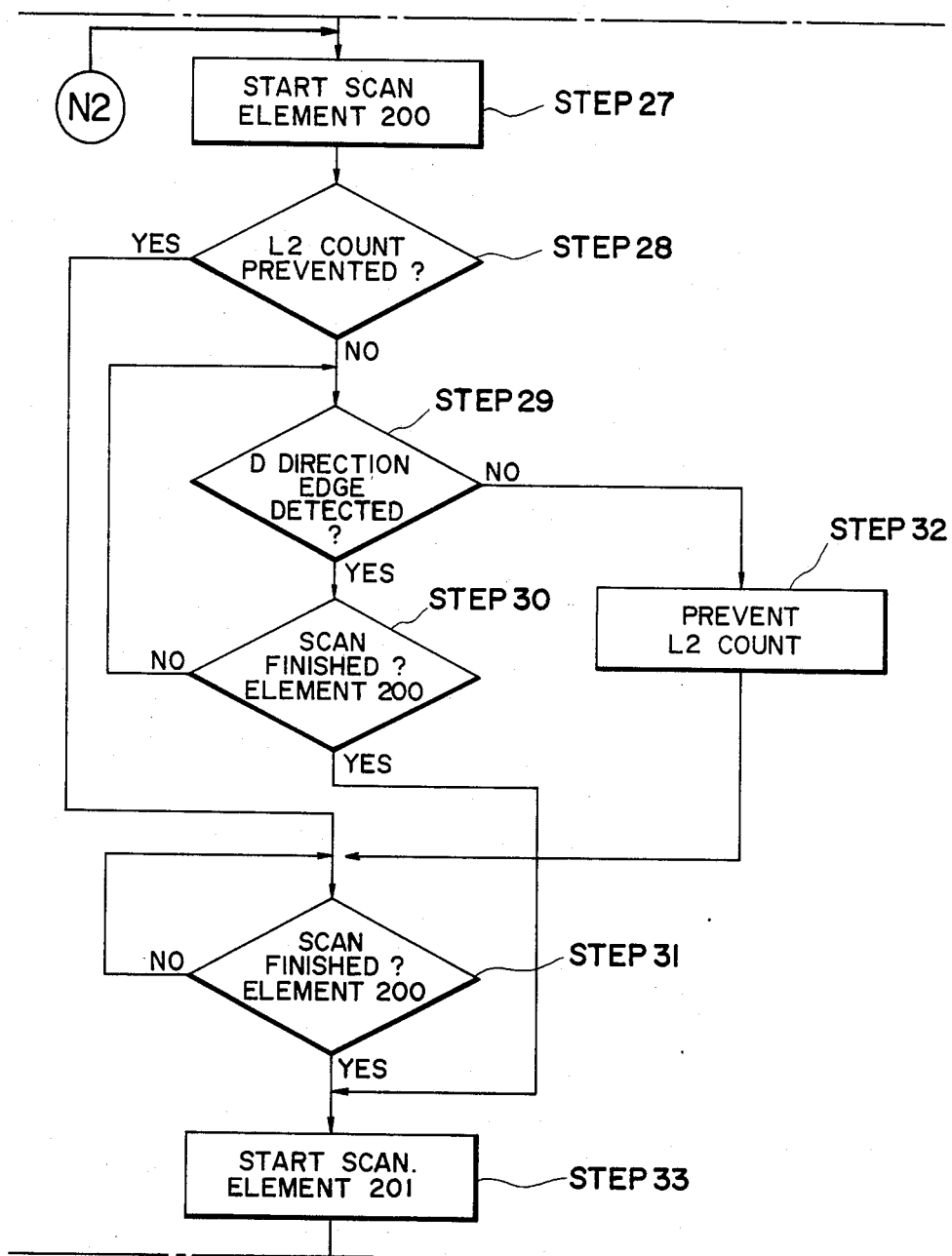
Figure 9E:
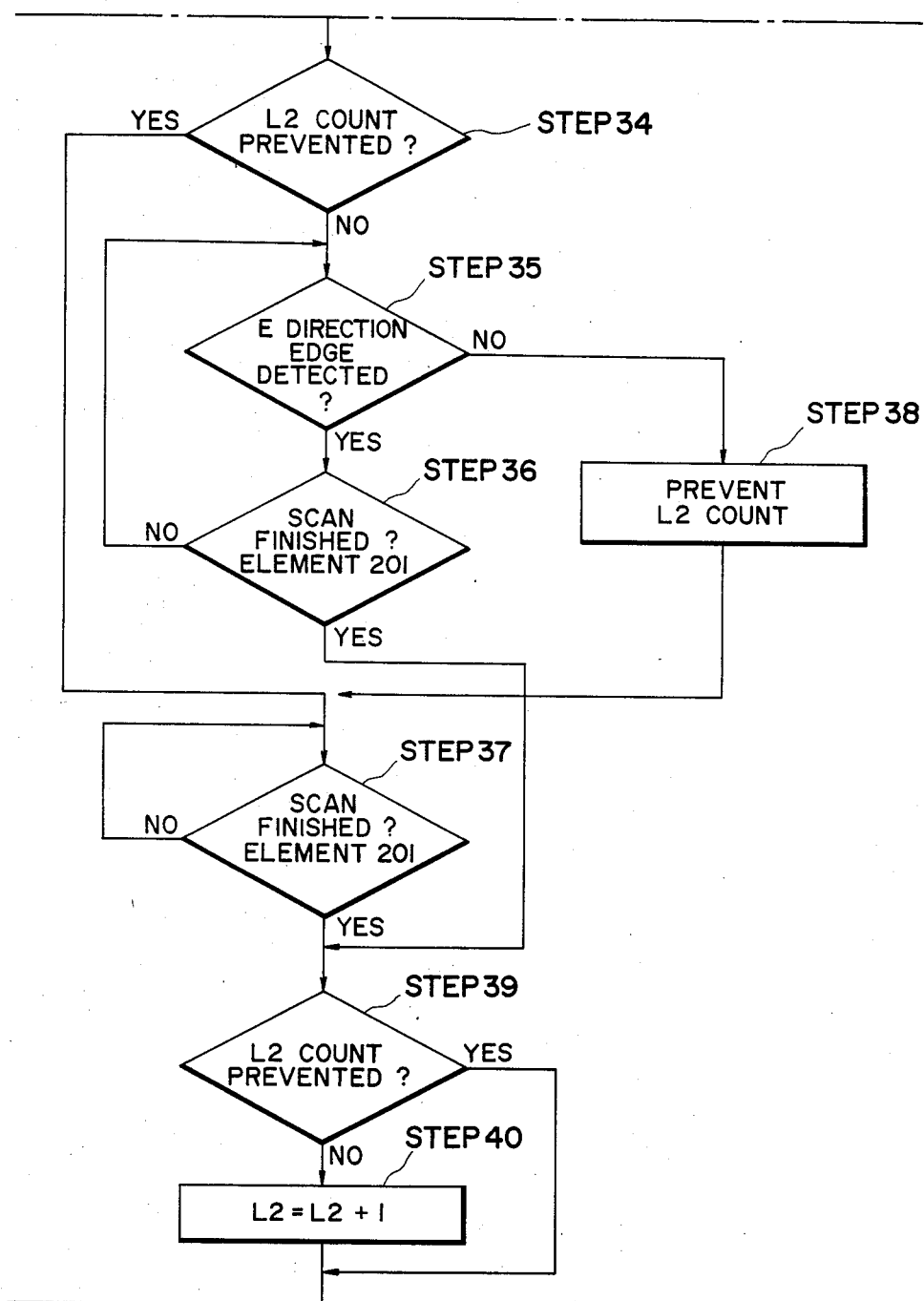
Figure 9F:
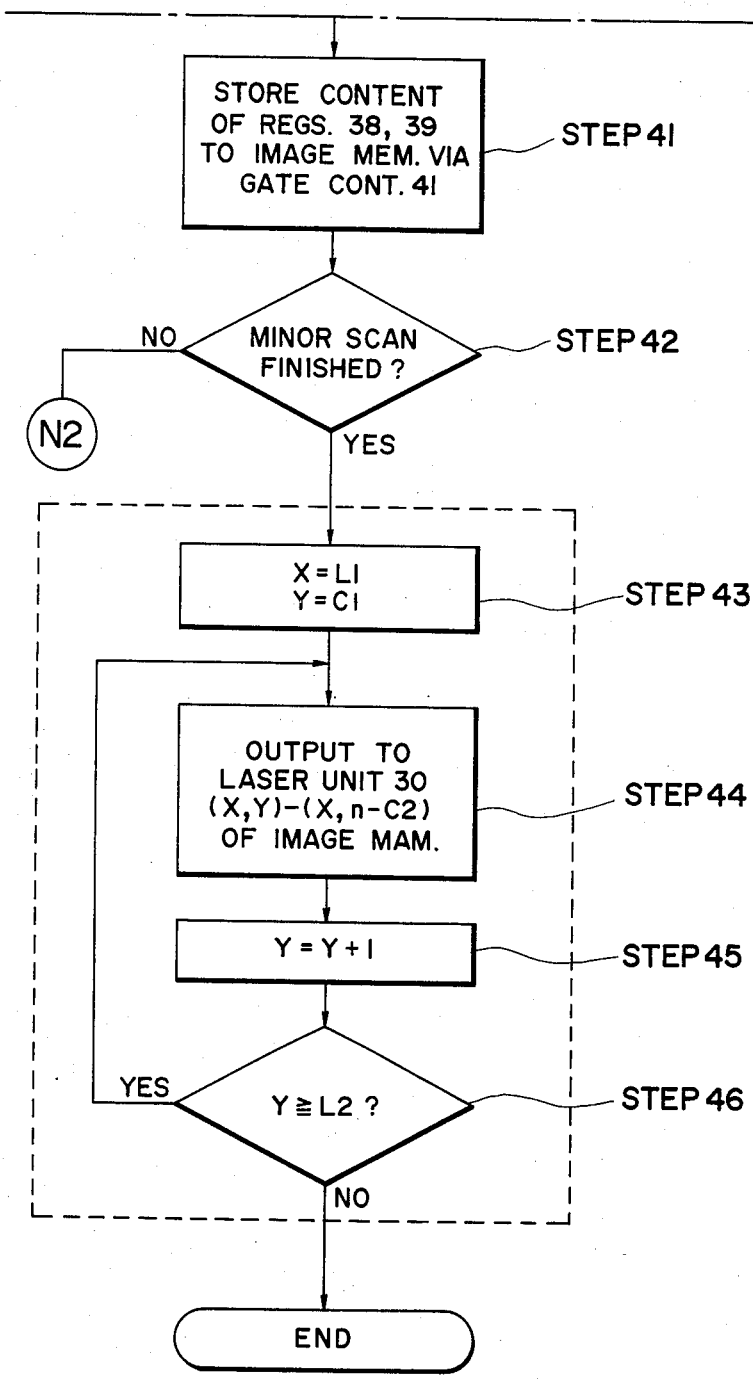

FIG. 9 shows a flow chart for illustrating the control operation of the control CPU 35 in the system shown in FIG. 6.

At Step 1, the minor scan for an original (movement of the carriage 181) is initiated. At the same time, the counters C1, C2, L1 and L2 are initialized to be zero (Step 2). At Step 3, the image pick-up element 200 begins the major scan. From Step 4 to Step 9, the image pick-up element 200 detects the end of the original in the major scanning direction D as shown in FIG. 6. At this detection, the counter C1 is stopped. If there is no detection, the counter C1 is cleared. Thus, it is discriminated whether or not the end of the original has been already detected at Step 4. If it has been detected, WAIT condition is maintained till Step 9 at which the scan of the image pick-up element 200 is terminated. Then, the program proceeds to the next step. If the end of the original has not been detected at Step 4, the image pick-up element 200 continues to actuate until the scanning operation thereof is terminated at Steps 6 and 7. If the end of the original is detected during this operation, the counters C1 and L1 are stopped to determine the point (L1, C1) in FIG. 7. Thereafter, the program is in WAIT until the scanning of the image pick-up element 200 is terminated at Step 9, and then proceeds to Step 12. If the end of the original is not detected by the image pick-up element 200 till termination of the scanning operation, the counter C1 is cleared. The program proceeds to the next step (Step 12).

At Step 12, the major scanning operation of the image pick-up element 201 is initiated. From Step 13 to Step 18, the end of the original is sought by the image pick-up element 201 in the direction E in the similar manner as in the image pick-up element 200. If the end of the original is detected, the counter C2 is stopped to store the count. The count in the minor scanning is assumed to be L1 when the end of the original is previously detected in the directions D and E. At Step 18, one scanning line is terminated. At Step 21, if the counter L1 is disabled, that is, if the end of the original has been already detected in the direction D or E, the line count L1 is not incremented. At Step 23, the count L2 is incremented by 1. By the end of this step, information for one picture element line which has respectively been read by the image pick-up elements 200 and 201 is stored in the registers 38 and 39 shown in FIG. 6. At Step 24, the registers 38, 39 and the gate controller 41 are controlled by the read-out controller 40 to cause the image memory 42 to store the image data by one line. At Steps 25 and 26, it is discriminated whether or not the ends of the original have been detected both in the direction D and E. If the end of the original has not been detected in at least one of the above directions D and E, the program returns to A and Steps 3 through 24 are repeated. If the ends of the original have been detected in both the directions D and E, the program proceeds to Step 27. Steps 27 through 37 provides a routine for determining the opposite end of the original, that is, the points c and d shown in FIG. 8.

If the end of the original becomes not detected in the direction D at Steps 28 to 31, it is judged that the end of the original has been detected. If the counter L2 has been disabled, that is, the end of the original has been detected in the direction D at Step 28 (in this case, the counter L2 is disabled), the program is in WAIT until the scanning of the element 200 is terminated, and then proceeds to Step 33. If the counter L2 has not been disabled at Step 28, the scanning operation of the image pick-up element 200 is continued at Steps 29 and 30. If the end of the original is not detected at Step 29 and 30, the counter L2 is disabled at Step 32 and the program proceeds to Step 31. If detected, the program proceeds to Step 33.

From Step 34 to Step 37, the scanning of the image pick-up element 201 is similarly repeated in the direction E. If the end of the original is detected in either of the direction E or D at Steps 39 and 40, the counter L2 is not incremented. Thus, one line has been scanned. The program proceeds to Step 41 at which data for the scan is stored in the image memory 42 as in Step 24. Steps 27 to 42 are repeated until the entire original has been scanned. At this time, data for all the scanned image is stored in the image memory 42.

The above routine is used to determine C1, L1, C2 and L2 in FIG. 7.

Namely, four addresses a(L1, C1), b(L1, n−C2), c(L2, C1) and d(L2, n−C2) in the image memory 42 of FIG. 8 are determined.

Steps 43 to 46 enclosed by broken lines is a routine for addressing the contents of the image memory 42 to provide a print output through the laser generator 30. First, at step 43, (X, Y)=(L1, C1) is provided to output an image from the point a of FIG. 8.

The major scanning output is changed from the point a to the point b in FIG. 8. At Step 47, b(L1, n−C2) is outputted from a(L1, C1). At Step 45, Y=Y+1 is provided to proceed to the next line. In other words, (L1+1) to (L1+1, n−C2) are outputted. If the end of the original is detected, that is, the procedure from L2 is effected at Step 46, Steps 44 and 45 are repeated to output lines from the point c to the point d. Thus, image output modulating the laser beam is terminated.

Figure 10:
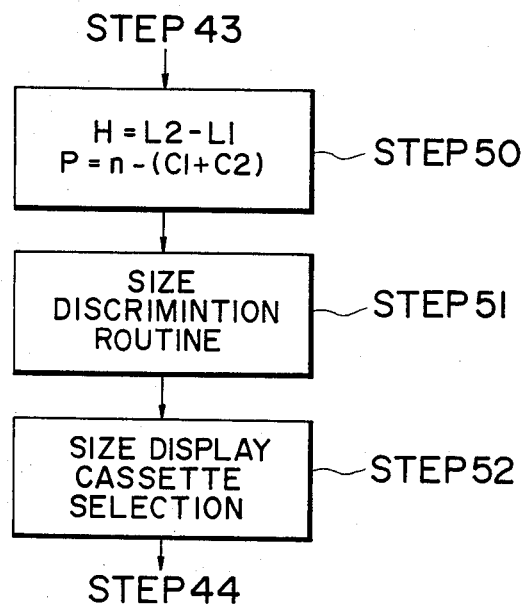

As shown in FIG. 10, the contents of the image memory 42 can be recorded in a recording paper matching to the size of the original by adding a size discrimination routine after Step 43.

In other words, at Step 50, H=L2−L1 and P=n−(C1+C2) are calculated in accordance with the count C1, C2, L1 and L2 to determine the transverse and longitudinal dimensions H, P of the original.

At Step 51, the size discrimination routine is executed to discriminate the size of the original in accordance with two values H and P. At Step 52, the indicator 46 indicates the discriminated size of the original and the cassette selection portion 47 selects one of the cassettes in which recording papers matching the size of the original are contained.

The image pick-up elements may be of two-dimensional primary scanning type other than one-dimensional primary scanning type.

Figure 11:
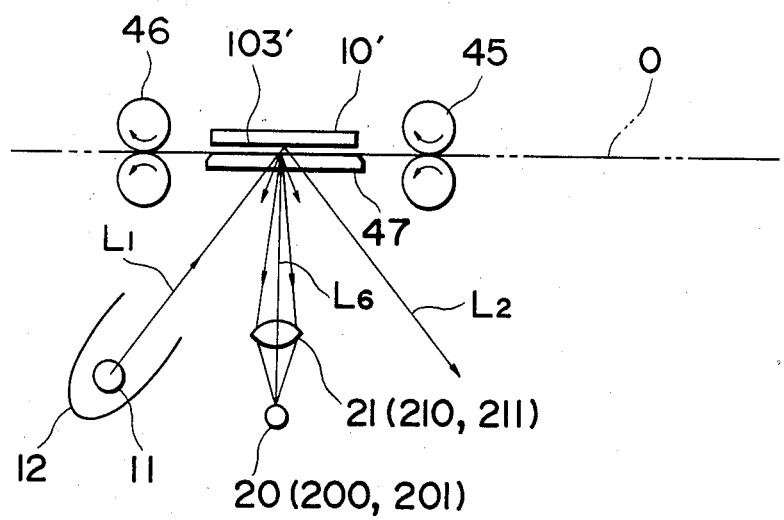
FIG. 11 is a view illustrating the third embodiment of the present invention.

Although the embodiments of the present invention have been described as to such a type that the elements 20, 200 and 201 are moved relative to the stationary original supporting carrier to scan the original, these elements may be stationary while the original supporting carrier is moved together with the aforementioned covering member to scan the original. Further, the present invention may be applied to such a system that the original is scanned by moving it through an illumination section by the use of any suitable means such as a belt, rollers or the like. For example, as shown in FIG. 11, a pair of rollers 45 and 46 are provided to convey an original sheet therebetween. At the illumination station including the lamp 11 and reflector 12, the original is moved in close contact with or near a transparent flat plate 47. At the plate 47, a reflection plate 10′ used as a covering member is disposed in close contact with or near the backface of the original O. The reflection plate 10′ may be made of any hard material such as aluminium, synthetic resin and includes a surface 103′ opposed parallel to the top face of the transparent plate 47. This surface 103′ is polished or plated to provide a mirror surface having a specular reflection property.

The elements 20 or 200, 201 and the lenses 21 or 201, 211 are arranged in the same manner as in the previous embodiments. In other words, the elements 20 or 200, 201 are so arranged that they do not receive a light portion specularly reflected by the upper and lower faces of the flat plate 47 and another light portion L2 specularly reflected by the mirror surface 103′ or that they will judge to be a black-colored area even if these light portion are received by the elements. On the other hand, light portion scatteredly reflected by the original O is used to discriminate the presence or absence of the original. As in the previous embodiments, the system shown in FIG. 11 can discriminate whether or not the leading edge of the original O reaches the illumination station; whether or not the trailing edge of the original O has passed through the illumination station; and the size of the original O.

In the aforementioned embodiments, the mirror surfaces 103 and 103′ are not necessarily of an ideal mirror surface which can specularly reflect any incident light. If they provide the amount of a specurally reflected light sufficiently larger than that of a scatteredly reflected light (that is, provide less scatteredly reflected light component in the order that the discrimination of the original with respect to presence or absence cannot be disturbed even if the scatteredly reflected light is incident on the elements 20, 200 and 201), the present invention can utilize them.

While the invention has been described with reference to the structures disclosed herein, it is not confined to the details set forth and this application is intended to cover such modifications or changes as may come within the purposes of the improvements or the scope of the following claims.

What is claimed is:

1. An image processing apparatus comprising:
a supporting surface for supporting an original;
means for illuminating the original supported by said supporting surface, said illuminating means being movable relative to the original;
a covering member for covering the back face of the original supported by said supporting surface, said covering member having a specular reflection surface opposed to said supporting surface;
means for providing a visualized image corresponding to the original on a recording material at a predetermined station;
means for conveying the recording material to said predetermined station;
light detecting means for generating an electric signal corresponding to the amount of light receiving thereby, said light detecting means being so arranged that it receives light emitted from said illuminating means and scatteredly reflected by said original, and does not substantially receive light emitted from said illuminating means and specularly reflected by said specular reflection surface; and
means for controlling said conveying means in response to the signal produced by said light detection means to move the recording material to said predetermined station in such a manner that the leading edge of the recording material is brought into a predetermined positional relationship with the leading edge of said visualized image.

2. An image processing apparatus according to claim 1, wherein said means for providing comprises a movable electrophotograhic photosensitive member, means for charging said photosensitive member, means for projecting light corresponding to the original onto said photosensitive member charged by said charging means to form an electro-static latent image thereon, means for developing the electrostatic latent image to form the visualized image, and means for transferring the visualized image from said photosensitive member to the recording material at said predetermined station.

3. An image processing apparatus comprising:
a supporting surface for supporting an orginal;
means for illuminating the original supported by said supporting surface, said illuminating means being movable relative to the original;
a covering member for covering the back face of the original supported by said supporting surface, said covering member having a specular reflection surface opposed to said supporting surface;
a movable electrophotographic photosensitive member;
means for charging said photosensitive member;
means for projecting light image of the original onto said photosensitive member charged by said charging means to form an electro-static latent image thereon;

means for developing the electrostatic latent image to form a visualized image;

exposure means for illuminating said photosensitve member in a position between said charging means and said development means;

light detecting means for generating an electric signal corresponding to the amount of light received thereby, said light detecting means being so arranged that it receives light emitted from said illuminating means and scatteredly reflected by the original, and does not substantially receive light emitted from said illuminating means and specularly reflected by said specular reflection surface; and means for controlling said exposure means in response to the signal produced by said light detection means to illuminate said photosensitive member at its region on which no image is to be projected, while said covering member is covering the original, whereby charge provided to said photosensitive member by said charging means is substantially removed from said region.

4. An image processing apparatus comprising:

means for illuminating an original, said illuminating means being movable in a first direction relative to the original to scan the original;

a covering member for covering the back face of the original, said covering member including a specular reflection surface opposed to said illuminating means;

image sensor means for electrically scanning a light image of the original in a direction intersecting said first direction to produce an image signal, said image sensor means being so arranged that it receives light emitted from said illuminating means and scatteredly reflected by said original and does not substantially receive light emitted from said illuminating means and reflected by said specular reflection surface, wherein a visualized image corresponding to the image signal is formed on a recording material; and means for detecting the size of the original in accordance with the output signal of said image sensor means.

5. An image processing apparatus as defined in claim 4, further comprising means for selecting a recording material matching the size of the original detected by said detecting means.

6. An image processing apparatus as defined in claim 5, further comprising means for recording on the recording material the visible image corresponding to the output signal of said image sensor at a predetermined station, means for containing recording materials of different sizes, and means for conveying the recording material of a selected size from said containing means to said predetermined station in response to the output signal of said selecting means.

7. An image processing apparatus as defined in claim 6, wherein said recording means comprises a movable electrophotographic photosensitive member, means for charging said photosensitive member, means for projecting light modulated in accordance with the image signal onto said photosensitive member charged by said charging means to form an electrostatic latent image thereon, means for developing the electrostatic latent image to form the visualized image, and means for transferring the visualized image from said photosensitive member to the recording material at said predetermined position.

8. An image processing apparatus comprising:

a supporting surface for supporting an original;

means for illuminating the original, said illuminating means being movable in a first direction relative to the original to scan it;

a covering member for covering the back face of the original, said covering member including a specular reflection surface opposed to said illuminating means;

image sensor means for electrically scanning a light image of the original in a direction intersecting said first direction to produce an image signal, said image sensor means being so arranged that it receives light emitted from said illuminating means and scatteredly reflected by the original and does not substantially receive light emitted from said illuminating means and reflected by said specular reflection surface;

memory means for storing the image signal; and means for detecting a position of the original on said supporting surface using an output signal of said image sensor means and for reading the image signal in a region corresponding to the position of the original out of said memory means, wherein a visualized image corresponding to the image signal read out of said memory means is provided on a recording material.

9. An image processing apparatus as defined in claim 8, further comprising means for detecting the size of the original in accordance with the output signal of said image sensor means, and means for selecting a recording material matching the size of the original detected by said detecting means.

10. An image processing apparatus as defined in claim 9, further comprising recording means which comprises a movable electrophotographic photosensitive member, means for charging said photosensitive member, means for projecting light modulated in accordance with the image signal read out of said memory means onto said photosensitive member charged by said charging means to form an electrostatic latent image thereon, means for developing the electrostatic latent image to form the visualized image, and means for transferring the visualized image from said photosensitive member to the recording material at said predetermined position.

11. An image processing apparatus as defined in claim 10, wherein said recording means comprises a movable electrophotographic photosensitive member, means for charging said photosensitive member, means for projecting light modulated in accordance with the image signal read out of said memory means onto said photosensitive member charged by said charging means to form an electrostatic latent image thereon, means for developing the electrostatic latent image to form the visualized image; and means for transferring the visualized image from said photosensitive member to the recording material at said predetermined station.

12. An image processing apparatus as defined in claim 11, wherein said recording means comprises a movable electrophotographic photosensitive member, means for charging said photosensitive member, means for projecting light modulated in accordance with the image signal read out of said memory means onto said photosensitive member charged by said charging means to form an electrostatic latent image thereon, mean for developing the electrostatic latent image to form the visualized image from said photosensitive member to the recording material at said predetermined station.

13. An image processing apparatus comprising:
a supporting surface for supporting an original;
means for illuminating the original, said means being movable in a first direction relative to the original to scan it;
a covering member covering the back face of the original, said covering member including a specular reflection surface opposed to said illuminating means;
image sensor means for electrically scanning a light image of the original in a direction intersecting said first direction to produce an image signal, said image sensor means being so arranged that it receives light emitted from said illuminating means and scatteredly reflected by the original and does not substantially received light emitted from said illuminating means and reflected by said specular reflection surface, wherein a visualized image corresponding to the image signal is formed on a recording material; and means for detecting the position of the original on said supporting surface in accordance with the output signal of said image sensor means.

14. An image processing apparatus as defined in claim 13, further comprising means for detecting the size of the original in accordance with the output signal of said image sensor means.

15. An image processing apparatus as defined in claim 1, 3, 5, 11 or 13, wherein said specular reflection surface is a polished metal surface.

16. An image processing apparatus as defined in claim 1, 3, 5, 11 or 13, wherein said specular reflection surface is a glass mirror.

17. An image processing apparatus as defined in claim 1, 3, 5, 11 or 13, wherein said covering member has a transparent sheet member contactable to the original and, as said specular reflection surface, a metallic layer disposed on said transparent sheet member.

18. An image processing apparatus as defined in claim 1, 3, 5, 11 or 13, wherein said covering member has a hard base plate member and a resilient plate member between said hard base plate member and said specular reflecting surface.

19. An image processing apparatus as defined in claim 18, wherein said specular reflecting surface is a flexible metallic layer.

* * * * *